G. O. PATTERSON.
ATTACHMENT FOR CULTIVATORS.
APPLICATION FILED JUNE 6, 1914.

1,118,225.

Patented Nov. 24, 1914.

Witnesses
Robert M. Sutphen
A. L. Hind

Inventor
G. O. Patterson
By Watson E. Coleman
Attorney

UNITED STATES PATENT OFFICE.

GRANT O. PATTERSON, OF CALLAWAY, NEBRASKA.

ATTACHMENT FOR CULTIVATORS.

1,118,225.   Specification of Letters Patent.   Patented Nov. 24, 1914.

Application filed June 6, 1914. Serial No. 843,476.

*To all whom it may concern:*

Be it known that I, GRANT O. PATTERSON, a citizen of the United States, residing at Callaway, in the county of Custer and State of Nebraska, have invented certain new and useful Improvements in Attachments for Cultivators, of which the following is a specification, reference being had to the accompanying drawings.

This invention relates to certain improvements in attachments for cultivators and has relation more particularly to a device of this general character especially designed and adapted for use in connection with the guide or bell wheel of a cultivator; and an object of the invention is to provide an attachment of this general character of a novel and improved construction affording a convenient and effective means whereby the plants, such as corn, which have been blown down by a side wind will be lifted so that the possibility of such plants being injured by the bell or guide wheel or being buried by the earth thrown by the disks and shovels is reduced to a minimum.

The invention also has for its object to provide an attachment of this general character which will crowd the plants to one side should the cultivator improperly follow the row so that the possibility of the plants being covered will be reduced to a minimum.

The invention consists in the details of construction and in the combination and arrangement of the several parts whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1:
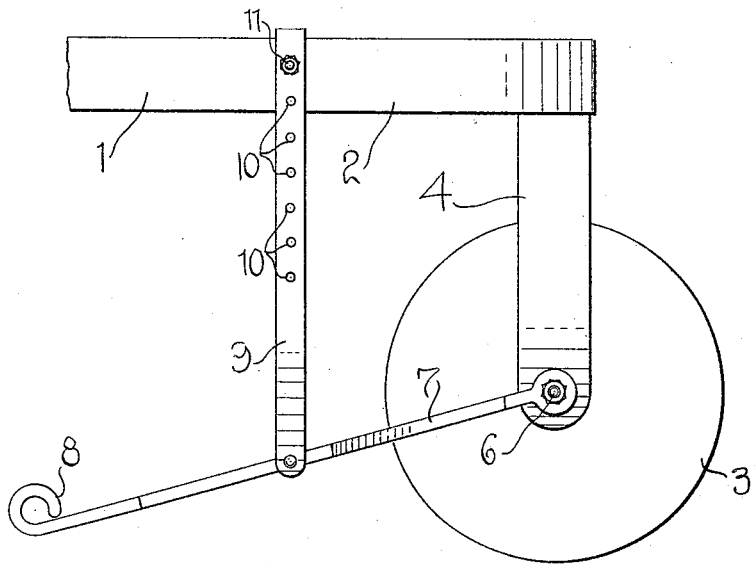
Figure 2:
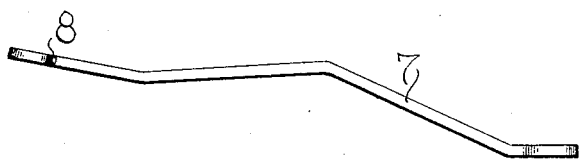

Figure 1 is a fragmentary elevational view of a cultivator showing an embodiment of my invention applied thereto. Fig. 2 is a view in top plan of my attachment as set forth in Fig. 1.

As disclosed in the accompanying drawings, 1 denotes a fragment of a disk cultivator of any ordinary or preferred construction including the tongue 2, such tongue being provided with the depending post 4 with which the guide or bell wheel 5 also of a well known construction is operatively engaged. Pivotally engaged with the shaft 6 of the guide wheel and projecting forwardly therefrom is an elongated bar or arm 7 of predetermined longitudinal formation, the free or forward extremity whereof being adapted to terminate in close proximity to the ground, such extremity being turned back, as indicated at 8, to afford a rounded end whereby it will be readily perceived that the possibility of the arm or bar from entering the ground and thus interfere with the operation of the cultivator is substantially entirely obviated. Intermediate its length the arm or bar 7 is provided with the upstanding arm 9 having its upper or free extremity provided with a plurality of longitudinally disposed openings 10 through which a suitable anchoring means 11 is adapted to pass whereby it will be readily perceived that the position of the outer or rounded extremity of the arm or bar 7 relative to the tongue 2 may be adjusted with convenience and facility in accordance with the necessities of practice.

It is thought to be obvious that as the cultivator advances the arms or bars 7 will engage beneath any of the plants, such as corn, which may have been blown down by a side wind and will lift such plants and force or throw the same to one side whereby they will be free from contact with the disks and be removed beyond the throw of the earth. It is also to be observed that should the cultivator improperly follow the row the attachment will engage the plants of an adjacent row and crowd the same to one side so as to be free of engagement by the guide or bell wheels and of the throw of the earth.

From the foregoing description, it is thought to be obvious that an attachment for a cultivator constructed in accordance with an embodiment of my invention is of an extremely simple and comparatively inexpensive nature and is particularly well adapted for use by reason of the convenience and facility with which it may be assembled and by reason of the effectiveness with which it performs its functions, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. In combination with a cultivator comprising a tongue and a guide wheel operatively supported thereby, of an arm pivotally engaged with the axle of the guide wheel and extending forwardly thereof and terminating in close proximity to the ground, and a second arm carried by the first named arm intermediate its length and disposed upwardly and provided with means whereby it may be adjustably connected with the tongue.

2. In combination with a cultivator comprising a tongue and a guide wheel operatively supported thereby, of an arm pivotally engaged with the axle of the guide wheel and extending forwardly thereof and terminating in close proximity to the ground, and a second arm carried by the first named arm intermediate its length and disposed upwardly and provided with means whereby it may be adjustably connected with the tongue, the forward or free extremity of the first named arm being flexed upwardly and rearwardly to afford a rounded end.

In testimony whereof I hereunto affix my signature in the presence of two witnesses.

GRANT O. PATTERSON.

Witnesses:
 FRED J. DRUM,
 Z. J. RAMSEY.

Copies of this patent may be obtained for five cents each, by addressing the "Commissioner of Patents, Washington, D. C."